(12) United States Patent
Moss

(10) Patent No.: US 8,706,666 B2
(45) Date of Patent: Apr. 22, 2014

(54) NETWORK IMPLEMENTED CONTENT PROCESSING SYSTEM

(75) Inventor: Nicholas Ian Moss, Middlesex (GB)

(73) Assignee: BAE Systems PLC, London (GB)

(*) Notice: Subject to any disclaimer, the term of this patent is extended or adjusted under 35 U.S.C. 154(b) by 1031 days.

(21) Appl. No.: 12/093,063

(22) PCT Filed: Nov. 7, 2006

(86) PCT No.: PCT/GB2006/004152
§ 371 (c)(1),
(2), (4) Date: Aug. 18, 2008

(87) PCT Pub. No.: WO2007/054679
PCT Pub. Date: May 18, 2007

(65) Prior Publication Data
US 2009/0119774 A1 May 7, 2009

(30) Foreign Application Priority Data
Nov. 9, 2005 (GB) .................................. 0522862.2

(51) Int. Cl.
G06F 17/00 (2006.01)
G06N 5/02 (2006.01)

(52) U.S. Cl.
USPC .............................................. 706/45; 706/48

(58) Field of Classification Search
None
See application file for complete search history.

(56) References Cited

U.S. PATENT DOCUMENTS

| | | | |
|---|---|---|---|
| 6,598,034 B1 * | 7/2003 | Kloth .............................. | 706/47 |
| 7,321,964 B2 * | 1/2008 | Filippo et al. ................. | 712/225 |
| 7,784,094 B2 * | 8/2010 | Balakrishnan et al. ......... | 726/13 |
| 2003/0118029 A1 * | 6/2003 | Maher et al. ............. | 370/395.21 |
| 2003/0229710 A1 * | 12/2003 | Lie et al. ........................ | 709/231 |
| 2004/0083387 A1 | 4/2004 | Dapp et al. | |
| 2005/0108518 A1 * | 5/2005 | Pandya .......................... | 713/151 |
| 2005/0108573 A1 | 5/2005 | Bennett et al. | |
| 2005/0237939 A1 * | 10/2005 | Corl et al. ..................... | 370/235 |
| 2006/0120373 A1 * | 6/2006 | O'Keeffe et al. ............. | 370/392 |
| 2008/0077995 A1 * | 3/2008 | Curnyn ........................... | 726/27 |

* cited by examiner

Primary Examiner — Kakali Chaki
Assistant Examiner — Daniel Pellett
(74) Attorney, Agent, or Firm — Tarolli, Sundheim, Covell & Tummino LLP

(57) ABSTRACT

In the present invention, a data processing device for processing streams of network borne data includes content inspection logic configurable to perform pattern matching functions on a received content stream and output match data, and a microengine for executing computer coded instructions, the microengine being coupled to the content inspection logic for configuring the pattern matching function of the content inspection unit in respect of a particular processing job for the received content stream and for processing the content stream independence on the match data. The microengine is adapted to reconfigure dynamically the content inspection logic in dependence on the match data thereby to modify the pattern matching function performed by the content inspection logic on the content stream during the course of a processing job. The present invention provides a novel architecture and method for processing content as it flows through a network. The processing of content includes parsing, analyzing, modifying and controlling the delivery of a content stream using a number of pattern matching techniques. Importantly, the present invention makes it possible to adjust the parameters of the pattern matching search as the search progresses through the content stream.

35 Claims, 8 Drawing Sheets

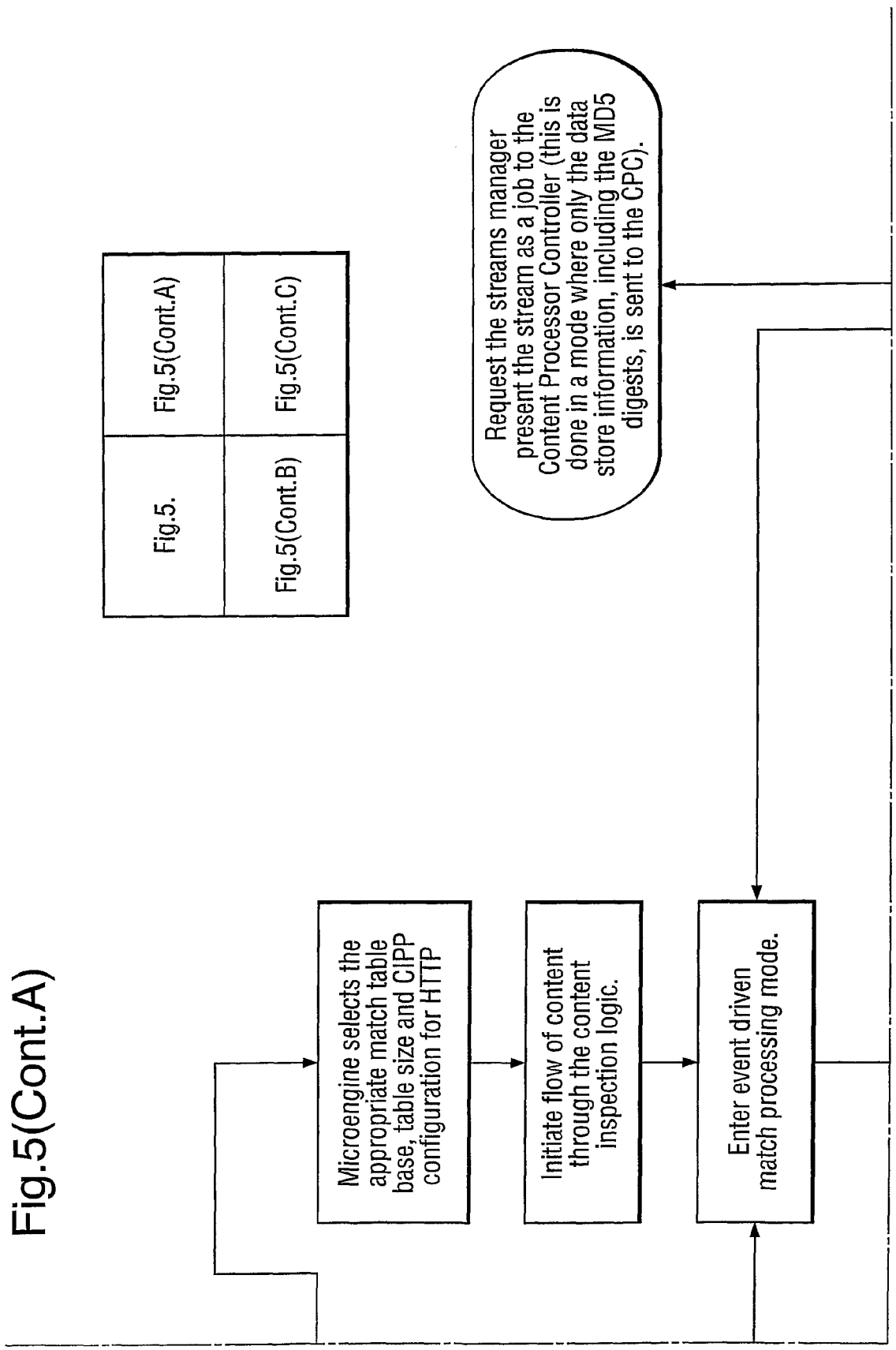

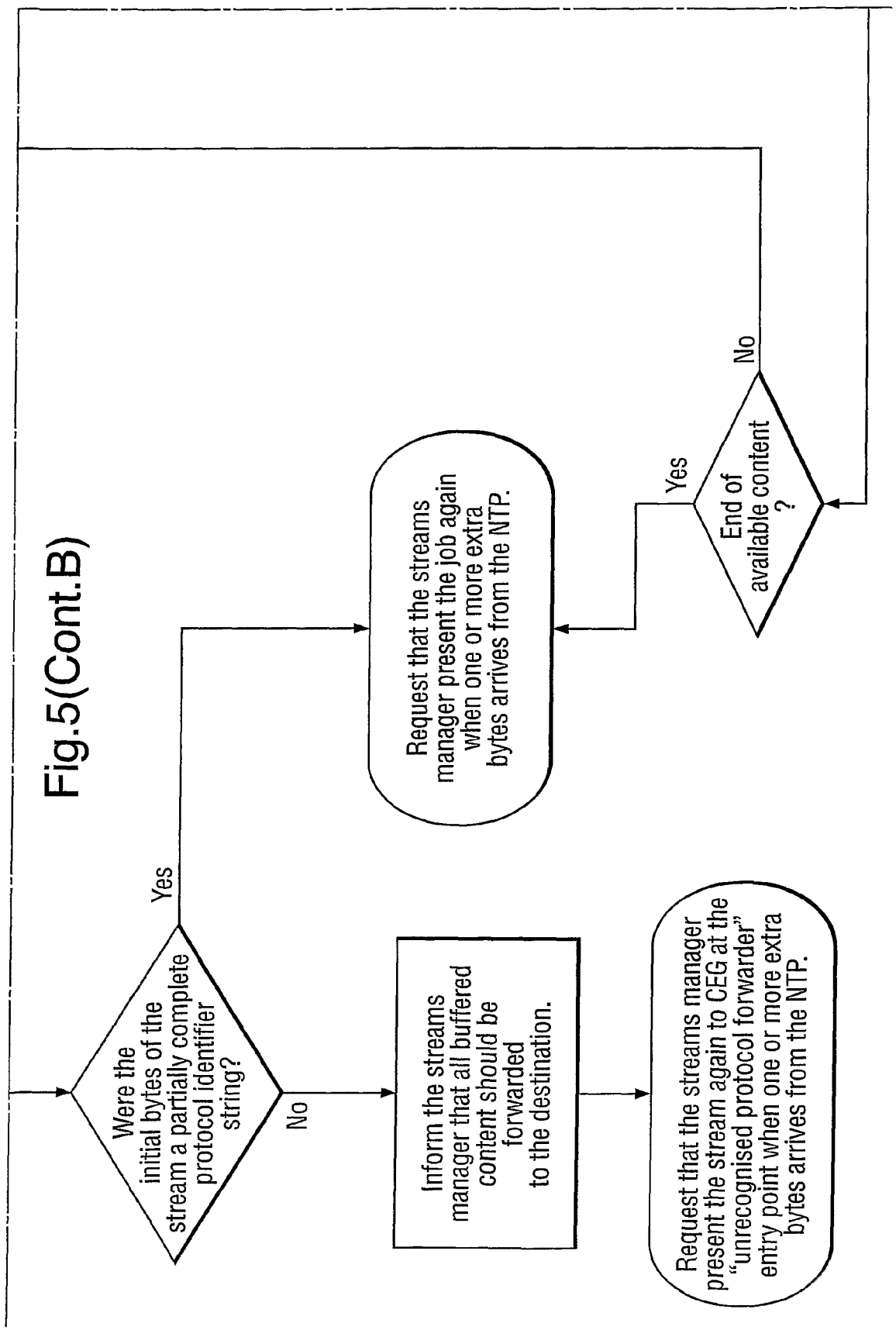

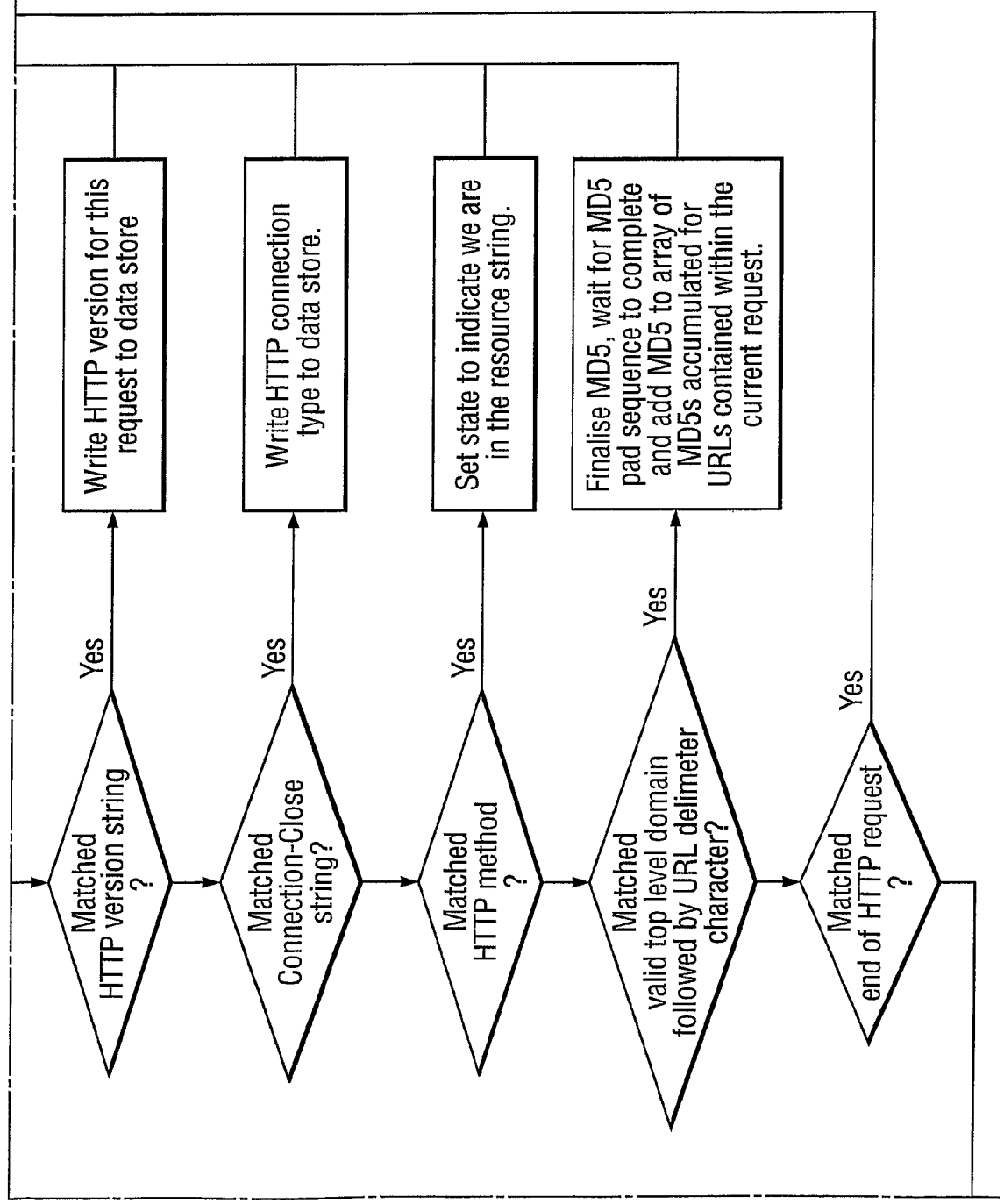

NETWORK IMPLEMENTED CONTENT PROCESSING SYSTEM

BACKGROUND TO THE INVENTION

Software based content processing solutions are deployed on e-mail servers or gateway devices such as firewalls or proxies. These software solutions are easily updated and upgraded with new information, algorithms or techniques. The problem with these software implementations is that they are both too slow for deployment in the actual networks (where they would be in line with traffic) and are not deterministic enough, which can add significant jitter.

Implementing such complex processing capabilities can be done in hardware which solves the problems of performance and jitter, but such hardware solutions usually can not be upgraded with such ease. With software solutions a new set of instructions is executed on an invariant platform, but where a hardware solution is re-designed the verification and testing process required is usually prohibitive in terms of time (e.g. responses to new threats must be made available within minutes, and new protocols or functions may be required within weeks or months). Indeed, hardware design cycles can sometimes take years.

The latest high-speed processing solutions usually incorporate software and hardware elements together. Software elements must execute on a CPU of type RISC, CSIC or DSP, none of which is optimised for content processing. Hardware solutions are collections of transistors or gates synthesised from high-level code, where a change in code requires a complete re-synthesis where the entire device changes, requiring a stringent and time consuming validation cycle.

Software approaches to the problem are inherently serial in operation. Regular expression matchers must be run one after the other and are therefore relatively slow. Signature matchers are faster, since a corpus of signatures is compiled to produce a single optimised state machine, but these generally require a final byte-by-byte comparison to establish an exact match. A software-only approach based on a general-purpose microprocessor must generally perform checks on the amount of content remaining etc., during the match process such that many instructions must be executed per byte of content passed through the system.

Existing hardware approaches are decoupled from the software that drives them. For example, an ldt Network Search Engine processes each network packet and delivers a digest of predefined fields in the packet to the associated processing element. Furthermore, these engines are essentially packet-based and do not address the needs of products working above the packet level on a reassembled content byte stream containing an OSI Layer 5 (or above) protocol.

A solution is sought that would enable complex processing to be performed at high enough speeds and with sufficiently low latency that it can be incorporated into network devices which sit in line with network traffic.

SUMMARY OF THE INVENTION

According to one aspect of the present invention, a data processing device for processing streams of data, comprises:

content inspection logic configurable to perform pattern matching functions on a received content stream and output match data; and, a programmable microprocessor unit for executing computer coded instructions, the microprocessor unit being coupled to the content inspection logic for configuring the pattern matching function of the content inspection unit in respect of a particular processing job for the received content stream and for processing the content stream in dependence on the match data, wherein the programmable microprocessor unit is adapted to reconfigure dynamically the content inspection logic in dependence on the match data hereby to modify the pattern matching function performed by the content inspection logic on the content stream during the course of a processing job.

Preferably, the programmable microprocessor unit is a microengine. The microengine has an architecture and instruction set which is optimised to process higher level (OSI Layer 5 or above) protocols and associated content.

Preferably, the device further comprises an instruction store coupled to the programmable microprocessor unit which stores a plurality of match handler routines. Preferably, the match data output by the content inspection logic includes an identifier that determines a stored match handler routine for the programmable microprocessor unit to execute to perform a predetermined processing function on the content.

Preferably, the device further comprises a match information store which is operative to convert match data, preferably in the form of a match index number, into a match handler request which identifies a match handler routine stored in the instruction store.

Preferably, the device includes a match queue portion coupled between the content inspection logic and the programmable microprocessor unit which stores match handler requests to be executed by the programmable microprocessor unit.

Preferably, the device further comprises an egress unit and a content queue portion, the content queue portion being coupled between the content inspection logic and the egress unit, wherein the content queue portion includes a content gate which is controlled by the programmable microprocessor unit to gate the flow of content into the egress unit. Preferably, the egress unit includes a memory portion for storing content.

Preferably, the device further comprises a data converter portion coupled to the content queue portion and to the programmable microprocessor unit, which is operative to generate data on values within predetermined fields within the content stream for consumption by processing functions executed by the programmable microprocessor unit. These fields typically include ASCII encoded decimal or hexadecimal numbers and the data converter portion provides access to continuously updated decimal and hexadecimal values for a portion of the content stream at the head of the content queue memory portion.

Preferably, the device further comprises a digest calculation portion which is operative to provide content digest data for consumption by one or more match handler routines stored in the instruction store.

Preferably, the device further comprises an input demultiplexer portion which is operative to extract control messages from within the content stream. Preferably, the control messages include state information associated with a received content stream.

Preferably, the device further comprises a data store coupled between the input demultiplexer portion and the programmable microprocessor unit, the data store storing state information contained within control messages extracted by the input demultiplexer portion from a received content stream.

Preferably, the device further comprises an ingress unit having a memory portion which is operative to store received content.

Preferably, the device further comprises a management state machine portion coupled to the ingress unit and to the programmable microprocessor unit, wherein the ingress unit is responsive to control messages extracted by demultiplexer portion to pass state information to the management state machine portion which determines the type of processing job to be performed for a received content stream. Preferably, the control message includes an entry vector number which identifies the type of processing job.

Preferably, the device further comprises a content inspection preprocessing portion coupled to the ingress unit, the content inspection preprocessing portion being operative to perform one or more data transformations on the content stream before it is passed from the ingress unit for pattern matching. The content inspection preprocessing portion may perform data transformations (e.g. Base64 decode, HTTP escape sequence removal) and feature recognition (e.g. illegal characters in a Base64 stream) in accordance with one of a number of pre-programmed finite state machines. Features recognised in the stream may also be tagged.

Preferably, the programmable microprocessor unit is adapted to perform a plurality of different types of processing jobs selected from a group of processing jobs which includes: protocol recognition, protocol decode, pattern matching, tokenisation, digest calculation, content decomposition and decompression.

Preferably, the content inspection logic includes a storage memory, preferably a content addressable memory (CAM), which stores a set of data patterns, wherein each processing job defines at least a first subset of data patterns to be used to support the content processing to be performed by the programmable microprocessor unit. These data patterns can be updated periodically from an external source.

According to another aspect of the present invention, a computer implemented method of processing streams of data comprises the steps of:

receiving a content stream;

extracting a control message from the content stream, the control message including an identifier which determines a type of processing job to be performed on the content stream;

initialising a content inspection logic to configure it to perform a first pattern matching function in dependence on the processing job;

processing match data output by the content inspection logic; and, reconfiguring the content inspection logic in dependence on the match data to perform a second pattern matching function during the course of a processing job.

Preferably, the control message includes state information associated with a received content stream. More preferably, the control message includes an entry vector number which determines the type of processing job to be performed.

Preferably, the match data includes an identifier that determines a stored match handler routine to be executed to perform a predetermined processing function on the content. More preferably, the match data is converted into a match handler request which identifies a match handler routine stored in an instruction store.

Preferably, the match handler requests are queued. More preferably, whilst one match handler routine is executed, the match handler routine for a subsequent match handler request is prefetched so that it is ready to be executed once the previous match handler routine has been completed.

Preferably, the received content is preprocessed by performing one or more data transformations before the transformed content is passed for pattern matching.

Preferably, the a number of different content processing jobs can be performed, including protocol recognition, protocol decode, pattern matching, tokenisation, digest calculation, content decomposition and decompression.

Preferably, the method includes the step of updating pattern matching functions stored in the content inspection logic.

Preferably, content is queued in a content queue whilst it is being processed and the flow of content to an output is controlled in dependence on the outcome of a content processing job. The flow of content may be reversed in dependence on the outcome of a processing job so that the same content can be reprocessed using a different pattern matching function. Furthermore, content may be modified before it is released from the content queue. Preferably, the method includes the step of adding state information to the content stream. Preferably, the state information includes a control message which identifies what further job processing is to be carried out on that stream.

The present invention provides a novel architecture and method for processing content as it flows through a network, where content is defined as both streams of higher layer protocol data (e.g. HTTP messages), or pieces of content (e.g. files, web pages, e-mails) extracted from the protocols that carry them. The processing of content includes parsing, analysing, modifying and controlling the delivery of a content stream using a number of pattern matching techniques. It is based on an optimised architecture which incorporates a mix of hardware and software techniques. Importantly, the present invention makes it possible to adjust the parameters of the pattern matching search as the search progresses through the content stream.

BRIEF DESCRIPTION OF THE DRAWINGS

An example of the present invention will now be described in detail with reference to the accompanying drawings, in which.

DETAILED DESCRIPTION

Figure 2:
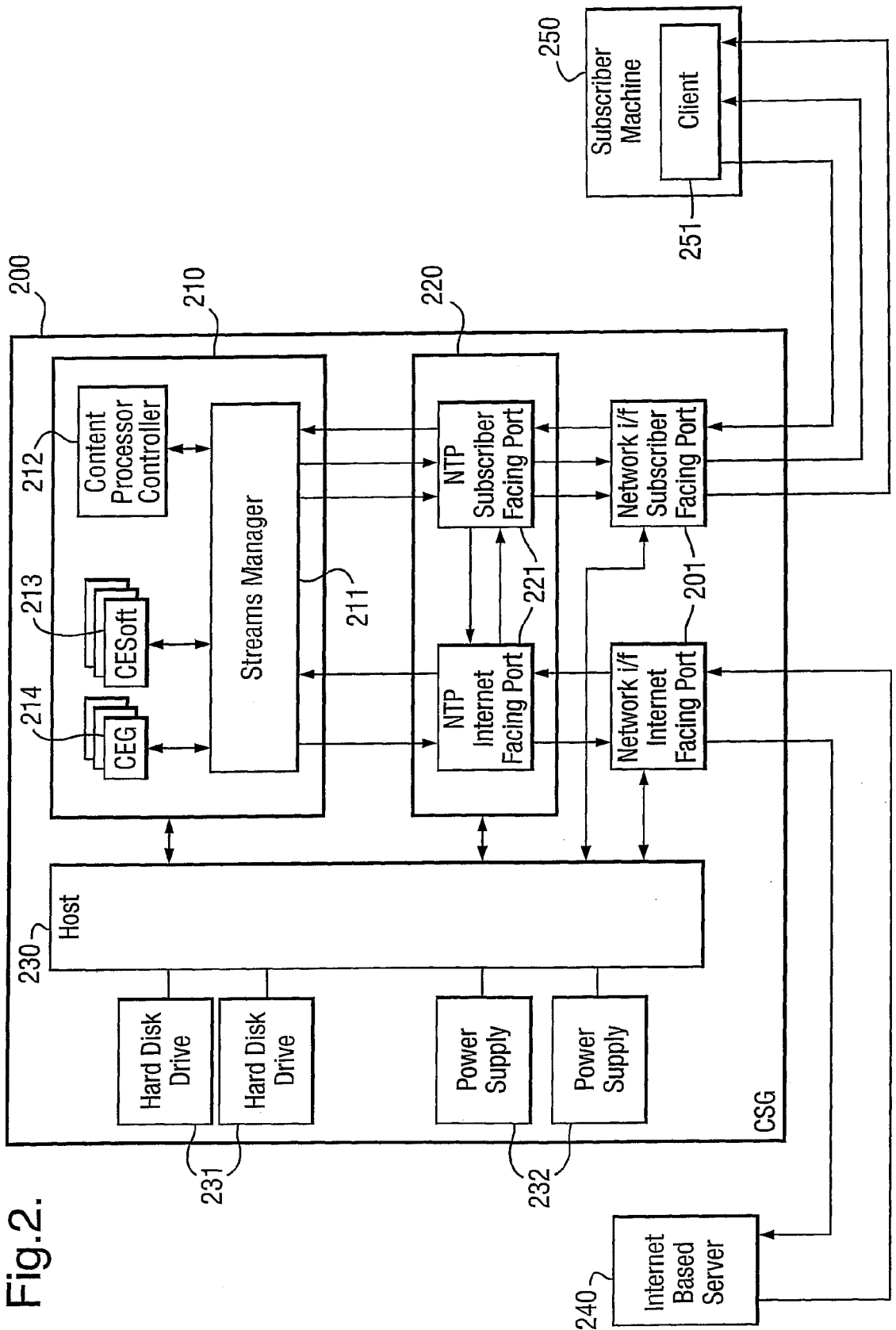
FIG. 2 is a block diagram showing the components of a Content Security Gateway (CSG)

Our co-pending International patent application number PCT/GB2005/03577 filed on 15 Sep. 2005, describes a Content Security Gateway (CSG) apparatus. A block diagram of such a CSG apparatus is shown in FIG. 2. The CSG is designed to capture, analyse, manipulate, and then deliver streams of data, thereby regulating subscriber access to streamed content.

The CSG apparatus is realised as an embedded system product incorporating hardware, software and micro-coded elements, which when combined with other standard infrastructure elements, such as web servers and databases, enables the delivery of content security services in real time.

Figure 1:
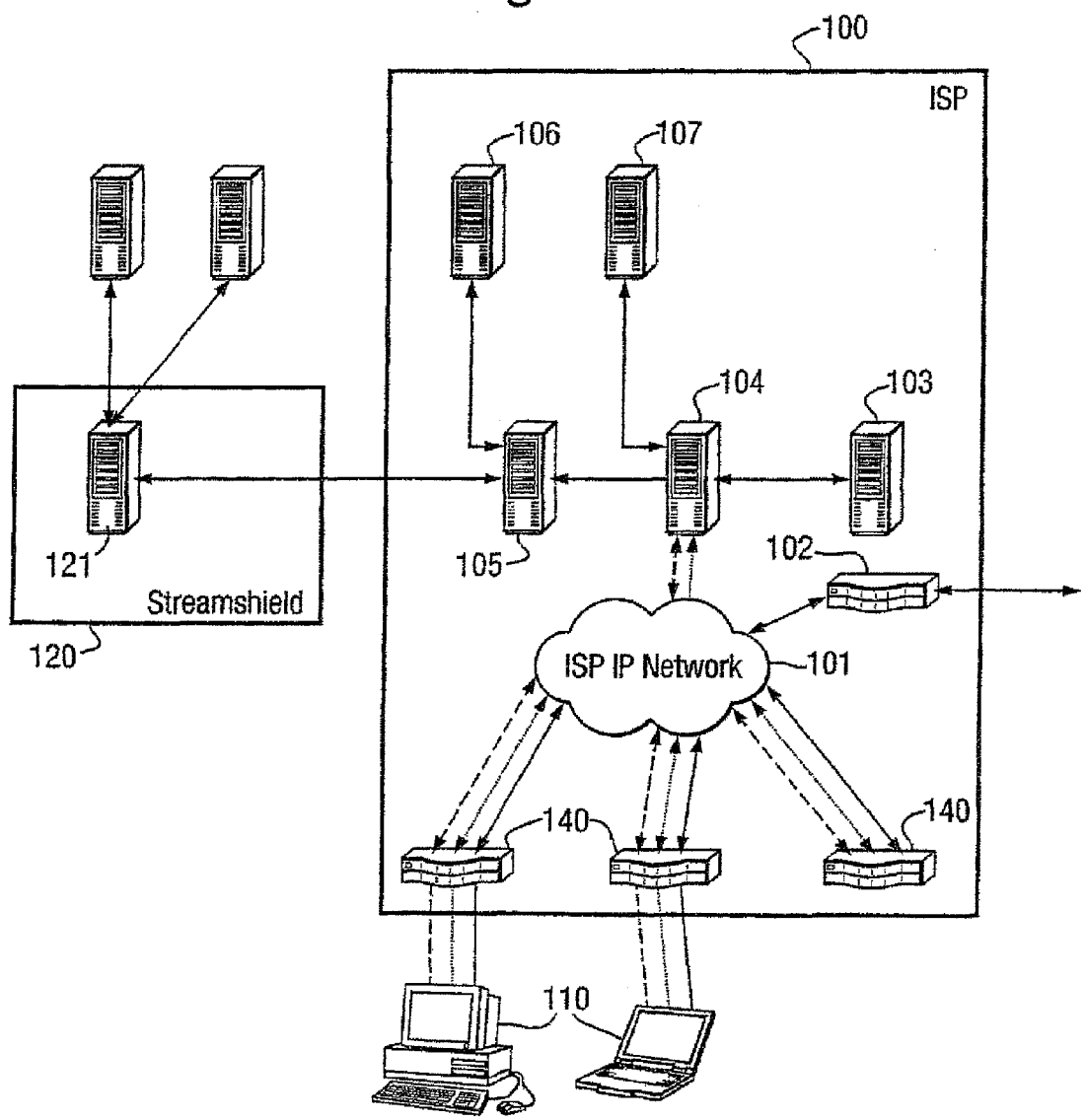
FIG. 1 shows an ISP network architecture in which an apparatus in accordance with the invention is deployed.

FIG. 1 shows how a number of CSGs 140 may be deployed in line with subscriber traffic, in Points of Presence operated by large ISPs or network operators. In the particular embodiment shown, the Solution Provider 120 (in this case Stream-Shield Networks) offers content security services to the subscribers 110 of an ISP 100. A number of CSGs 140 are deployed within the ISP's system 100 and are connected to other components via the ISP's internal network 101. The CSGs 140 deployed in the ISP are centrally managed by a single StreamShield [RTM] server 105 which provides code and information updates, and allows distribution of information between CSGs 140. An ISP administrator 106 also has access to the StreamShield server 105, allowing the ISP 100 to configure the CSGs 140 as required. FIG. 1 also shows how the services provided by the CSG 140 can be integrated into the billing system used by the ISP or network operator, through connection to their authentication (RADIUS) 103 and billing infrastructure 107.

In this embodiment, the RADIUS server 103, billing infrastructure 107, and StreamShield server 105 are all connected to the ISP network via the ISP subscription server 104. Additionally, there is a StreamShield.NET server 121 outside the ISP's system 100 which collects updates of information from the CSGs 140 used by any ISP or network service provider, and distributes these to the CSGs 140 via the StreamShield servers 105 in each ISP or network provider. Note this is just one example of a network infrastructure that incorporates the CSG 140, and other examples could deploy CSGs 140 at the peering points 102 of the ISP (where the ISP core network connects to the Internet) or in front of high load server farms (such as e-mail server farms). Additionally the ISP may re-sell the services made available by the CSG 140 to other ISPs which utilise the ISPs network infrastructure (e.g. Virtual ISPs and second tier ISPs).

A Content Processor (not shown) employed by the CSG 140 enables it (and, by extension, the ISP) to deliver a number of services (e.g. URL filtering, Anti-Virus) where these services are purchased and used by subscribers. These subscribers can then select which services they wish to be applied to the various applications they may use.

FIG. 2 is a block diagram showing the components of a CSG 200. The CSG 200 is placed on a network between an internet-based server 240 and a subscriber machine 250. A client 251 is shown installed on the subscriber machine 250. A Content Processor (CP) 210 is shown to comprise a Streams Manager (SM) 211, a Content Processor Controller (CPC) 212, a plurality of software based content processors (CESoft) 213, and a plurality of Generic Content Engines (CEG) 214. The CPC 212 is optimised to take the results of the processing performed by the CEG of the present invention and to perform software lookups in large databases. The CPC 212 also performs system housekeeping and statistics collection. The CESoft 213 is adapted to present sections of content as determined by the present invention to software analysis tools such as industry standard virus scanners. All three content processor types are able to access the same information about any given content stream, although in practice, each processor type is used in a specific way in order to maximise performance (e.g. the CPC 212 generally only looks at the state information for a stream and does not directly process content).

The distributed system is held together by the SM 211, which manages the storage of content and state for each network flow as well as maintaining queues of flows requiring processing by the three classes of content processor. Interface elements within the SM 211 control the flow of data and control in the form of packetised messages to and from the SM 211 along dedicated high-speed links star wired to the content processing elements.

A Network Termination Processor (NTP) 220 is responsible for identifying which traffic should have services applied to it, then capturing this content from the protocols that carry it, and then presenting it as streamed content/data to the CP for processing. Note the NTP 220 is multi-protocol aware, and can extract content from any carrying protocol such as TCP, UDP, or IP. Both the NTP 220 and the CP 210 are supported by host hardware 230 having storage 231 (i.e. hard disk drives) and a power supply 232.

The CSG network ports 201 are connected to the network ports 221 of the NTP 220. The NTP 220 interfaces to standard network ports 221 (e.g. 10/100 Ethernet, 1 Gbit/s Ethernet, FDDI, OC12, STM16 etc.) Which transmit and receive traffic to/from the networks which are connected to the CSG 200.

The CSG 200 is intended to provide services for subscribers, however its deployment within the network may mean that non-subscriber traffic is also passed through the CSG 200. Therefore the NTP 220 must identify subscriber traffic and non-subscriber traffic. This is done through comparing the source IP address, destination IP address and protocol information of traffic arriving on each network port, and comparing these IP addresses against a list of IP addresses (Access Control List or ACL) currently used by subscribers.

When the NTP 220 has determined whether packets should be processed by the CP 210, for packets sent over a TCP connection or over UDP, the NTP 220 extracts the payload from these protocols, to yield a stream, and passes information received on this stream to the CP 210 with an accompanying subscriber identifier. This stream may arrive at the CSG 200 over a sustained period of minutes, hours or even days, and as each piece of information arrives the NTP 220 extracts the stream information and passes this to the CP 210 with the subscriber identifier. This subscriber identifier does not distinguish between separate subscriber's using the same network connection. The CP 210 may also perform further subscriber identification techniques.

The NTP 220 achieves this by terminating TCP connections locally within itself. This means that instead of a TCP connection forming end-to-end between the subscriber machine 250 and a destination machine, one connection forms between the subscriber and the CSG 200, and a second forms between the CSG 200 and the destination machine. When a new flow using TCP is detected, and the NTP 220 determines it belongs to a subscriber, at this point the two connections are set-up. Typically, the session layer protocol (e.g. HTTP) is still end-to-end, although the CP 210 may manipulate information passed over this session. The CP 210 may perform a proxy function at OSI Layer 5 (or above). The CSG 200 may operate the TCP termination in the manner of a conventional network proxy (e.g. each connection utilises distinct network and link layer addresses), or in a transparent manner such that these link layer and network layer addresses are identical on the pair of TCP connections.

Figure 3:
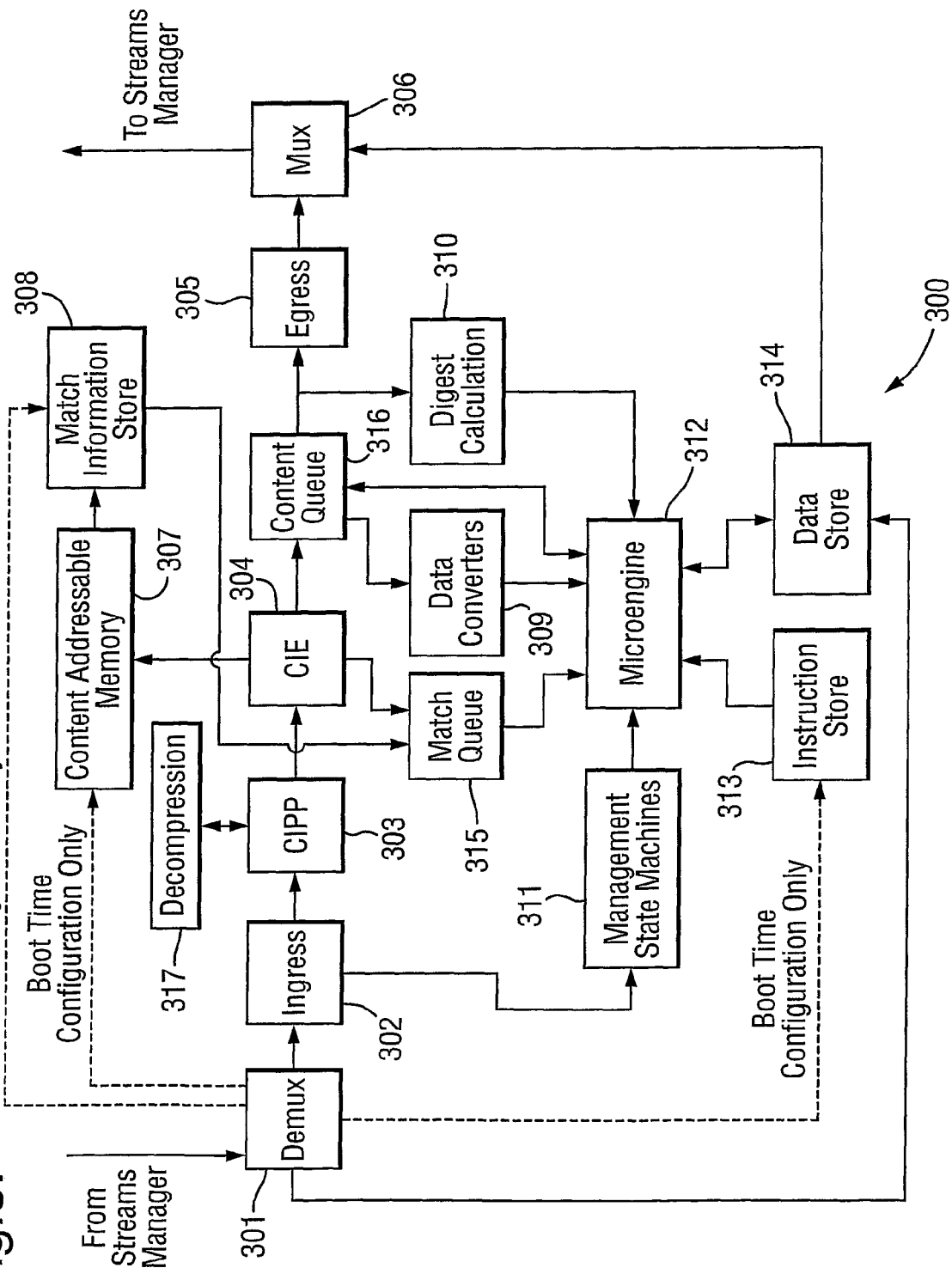
FIG. 3 is a block diagram of an example of a content processing device in accordance with the present invention.

The CEG 214 shown in FIG. 2 includes five main components. Together, these form a processing solution capable of operating on content at high speeds with minimal latency, and in a deterministic manner. As shown in FIG. 3, these five main components are linked to form a CEG 300 where each component block is specifically designed for processing of content (as opposed to generic or other specific processing applications):

1. Control and support logic. These components 301, 306, and 311, handle management of the flow of content through the CEG 300, including maintaining counters, packetising and de-packetising messages to and from the CEG 300 and keeping the processing elements busy by pipelining control messages to ensure that work is always available.
2. Content Inspection Pre-processor (CIPP). The CIPP component 303 works on a content byte stream. It performs transformations (e.g. Base64 decode, HTTP escape sequence removal) and feature recognition (e.g. illegal characters in a Base64 stream) in accordance with one of a number of pre-programmed finite state machines. Features recognised in the stream may be tagged and the information used by stages that follow (see below).

3. Content Inspection Engine (CIE). The CIE component 304 works on the content byte stream output by the CIPP 303; it performs pattern matching and converts each match into an entry vector, match information and stream offset triplet that is placed in a FIFO match queue 315 and later processed by the ME (see below).

4. Microengine (ME). The ME 312 shares some features of a classic RISC microprocessor, having a general purpose register set, an ALU and a memory load/store unit. It is differentiated by the use of a primarily event driven control flow, where every instruction has the option to halt and relinquish control to the handler for the next match entry from the CIE match queue 315 mentioned above. The instruction set itself is also optimised for stream processing by including direct access to the head of the content pipeline from within the ME's basic register set for instance and by providing modifiers such that the exact behavior of a load or store operation that accesses the CIE hardware can be specified.

5. Dedicated hardware accelerators. A number of industry standard algorithms are accelerated by dedicated hardware (e.g. MD5, deZIP) 310 and 317.

The CEG 300 is designed to accelerate the following tasks:

Protocol recognition, i.e. heuristic recognition of an arbitrary network protocol based on examination of the protocol's bidirectional data flow. This is an important feature, since most high-level Internet protocols do not contain a single unambiguous identifier.

Protocol decode, i.e. tracking state within high level protocols that typically use human readable textual keywords and ASCII numeric fields with a high degree of variation in their presentation (for instance indiscriminate use of upper and lower case, infinite variability in the amount of white space between tokens and in the position and number of line breaks inserted).

Pattern matching, i.e. recognition of complex data sequences that may indicate spam, malware or network borne worms for instance.

Tokenisation, i.e. breaking a section of content into an array of tokens using a simple set of rules e.g. space delimited words of between 3 and 7 letters in length. Such a function is useful in the heuristic recognition of email-based spam for instance.

Digest calculation, i.e. the application of industry standard signature generation techniques such as MD5 to specific portions of a stream's content.

Content decomposition, i.e. separating a unit of content into its constituent parts and making these parts available to other specialist processing entities within the system (e.g. extraction of e-mail attachments In some cases, the constituent parts will be pre-processed to reduce the complexity of the processing step that follows (e.g. decoding of the Base64 encoding used by e-mail transports).

Decompression, i.e. processing common data compression formats such as "deflate" to derive the uncompressed original in preparation for further processing.

As described above, hardware blocks within the CSG receive network borne content. In the case of certain network traffic types, such as TCP, packetised data is reassembled into a continuous byte stream (i.e. packet boundaries are removed) by the NTP. Content is written into queues, known as streams, such that there is one stream for each active network flow, where a flow is a single direction of data transfer from a single active port on a particular network connected device to another active port on a second network connected device. Streamed data is stored in a buffer that is managed by the SM.

At a time determined by the SM based on pre-programmed criteria, the current contents of a given stream are passed as a series of messages over a high-speed link from the SM to the CEG. A de-multiplexer 301 separates the content messages from control messages passing over the same link and directs them to an ingress unit 302, which stores the content as a byte stream in a local FIFO memory (not shown). The purpose of the ingress unit 302 is to smooth the flow of data into the subsequent processing elements and to provide a measure of random access into a small window of content. The size of the FIFO within the ingress unit 302 is generally small (e.g. 4 kilobytes). If the total content exceeds the size of the ingress FIFO, flow control messages are used on the reverse link to halt the flow of content from the SM until the ingress unit is ready for more data. The exact criteria used to determine when a stream should be processed and the starting point in the available data at which processing should start are based on default values for new streams, but are dynamically updated by the CEG after each processing event or "job".

At the same time, the SM sends control messages containing state information relating to the current stream. This information is written into a data store 314. A further control message, known as "job control", is directed to the ingress unit 302, which in turn supplies information to management state machines 311. This last message includes an entry vector number that determines the type of processing that the CEG will perform on the content.

The first processing step requires that the ME 312 run program code as determined by the entry vector number. This code configures the CIPP 303 and CIE 304 according to the function entry vector and any information in the stream state regarding the nature of the processing operation to be performed (e.g. web HTML parsing, virus signature matching, SMTP e-mail transfer protocol parsing).

Following configuration, content is allowed to pass from the ingress unit 302 through the CIPP 303 and into the CIE 304.

The CIPP 303 may transform the content stream by undoing common encodings such as Base64, quoted printable or HTTP escaping. In cases where the one byte on the output represents multiple bytes on the input, the output bytes are annotated with delta values that are used by subsequent stages to keep content position counters within the ingress unit 302 in step with the true position in the unmodified content.

The CIE 304 presents groups of content bytes to a Content Addressable Memory (CAM) 307. The CAM 307 is pre-loaded with a complete set of byte patterns that are of interest in the context of the chosen processing function.

Content bytes flow freely through the CIE 304 until the CAM 307 registers a match for a byte group of interest. The match is output by the CAM 307 in the format of a binary number indicating the index of the entry that matched.

A match information store (MIS) 308, which is directly attached to the output of the CAM 307, converts the index into the address of the start of a handler procedure stored in an instruction store 313 connected to the ME 312. The address depends on the match index and the processing function selected.

Requests to execute handlers are queued in a match queue 315 such that as soon as the ME 312 completes processing of previously queued tasks, it will enter the handler for the new match.

The CIE 304 ensures that the ME 312 is able to view the portion of the stream that generated the match, since generally, the ME 312 will inspect a number of bytes located close to the match in order to update its internal processing state. This is done by controlling the flow of content out of a content queue 316. Each of the queues 315 and 316 is typically 512 entries in size, thereby allowing for some elasticity in the throughput of the ME 312 relative to the CIE 304.

Some functions may need to modify the content data as opposed to simply viewing it. Others may extract portions of the content for digest calculation or for further processing by entities external to the CEG. In these cases the ME 312 can update the state of a gate (not shown) in the CIE 304, which gates the flow of content into an egress unit 305 and a digest calculation unit 310. The ME 312 can also insert extra bytes of its choosing into the gated egress stream at any point.

Some functions need to extract fields from the content, such as ASCII encoded decimal or hexadecimal numbers. Data converters 309 facilitate this by providing access to a continuously updated decimal and hexadecimal value based on the most recent contiguous set of valid numeric bytes to be removed from the head of the content queue.

The egress unit 305 maintains a small local buffer (typically less than 4 Kilobytes) for the purpose of smoothing the flow of content back to the SM. Modified content written back through the egress unit 305 replaces the original data stored on the queue for the stream being processed. The ME 312 also posts control messages into the egress unit 305. Both content and control messages are sent to the SM via a multiplexer 306 and the return path of the high-speed link.

When processing of the available content for the current flow is complete, the ME 312 performs an almost immediate context switch and begins processing of the next stream, whose control information will already have been loaded by the SM. Meanwhile, any changes to the stored state for the stream that has just completed processing are converted to control messages that are sent by the data store 314 back to the SM via the multiplexer 306 and the high-speed link.

It should be noted that the CAM 307, MIS 308 and instruction store 313 are read-only at runtime and are statically initialised as part of the boot sequence using control messages from the SM. The paths required to do this are not shown as dashed lines in the figure.

The ME 312 benefits from the following features dedicated to content processing:

Direct access to the 4 bytes at the head of the content queue through the main register set. All loads from the head of the content queue have option flags to advance the queue or not and to discard matches that have been skipped or not. This potentially wraps several operations on a normal microprocessor into a single instruction.

Writing to the content head inserts bytes into the egress unit 305. It is therefore very easy to build messages in the egress unit 305 or insert content into the content stream.

A single register in the main register set can be used to store both content processing state and to control CIE functions such as the content gate between the CIE 304 and the egress unit 305 and digest calculation unit 310.

All internal control register accesses block until the appropriate piece of hardware is ready. This removes the need for polling.

The pre-fetcher and instruction cache look one match queue entry ahead, meaning that code for the next match vector in line should be available by the time the current match processing is completed.

An important feature of the CEG, which differentiates it from other devices designed to perform similar tasks, is the linkage between the CIE 304 and its associated pattern matching sub-system and the ME 312.

Figure 4:
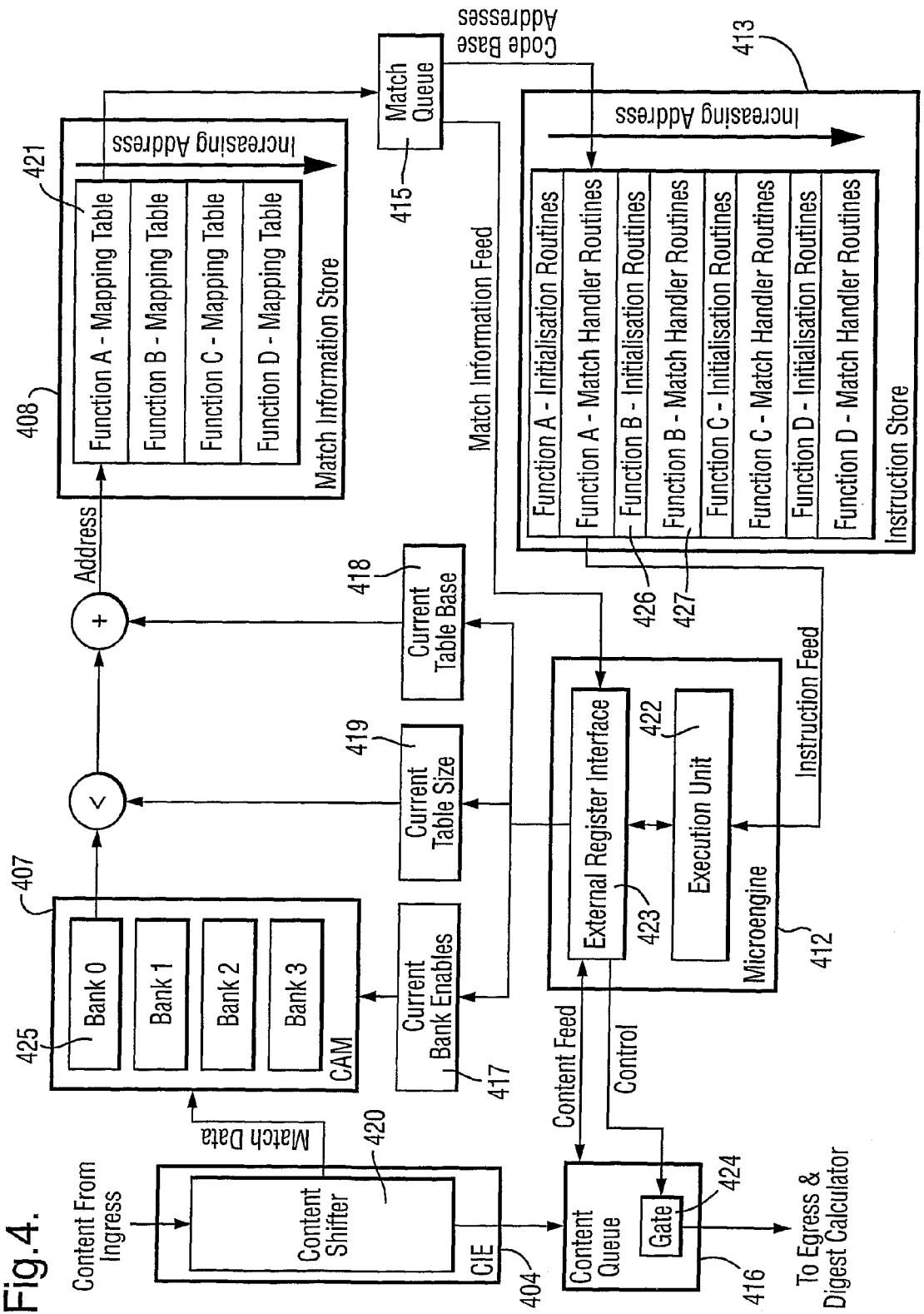
FIG. 4 shows the flow of data within the content processing device of FIG. 3; and, FIG. 5 is a simplified flow diagram which shows steps in processing the first job on a new content stream stream within the content processing device shown in FIG. 3.

FIG. 4 shows a more detailed view of this relationship by illustrating the data flow during normal operation of a CEG 400, rather than the actual interconnects between system components.

With reference to FIG. 4, the processing actions that can be performed by the CEG 400 are determined by three datasets, namely patterns programmed into the CAM 407, tables stored in the MIS 408 and instructions (initialization routines 426; match handler routines 427) stored in the instruction store 413.

The three datasets are derived using a proprietary software tool that processes human readable source code files, written in accordance with a special syntax developed specifically for the purpose of programming the CEG, and outputs three binary data files. These binary files are made available to the CPC at boot time or whenever an upgrade of the content processing system is required. The contents of the files are packetised by the CPC to form a set of configuration messages and directed by the SM to the de-multiplex unit 301 shown in FIG. 3. The de-multiplex unit parses the incoming messages and supervises the process of writing the data payload of each message to the correct location within the appropriate storage device. Once this initial download phase is complete, the contents of the three data storage devices 407, 408 and 413 remain static until a new version of the binary configuration files is presented to the CPC.

The collective set of processing actions is subdivided into "functions", each of which is responsible for one particular kind of processing (e.g. parsing the client to server flow of an HTTP connection constitutes a function). As previously described, processing activity within the CEG is initiated by a sequence of messages from the SM, notably the job control message, which contains an entry vector for the function that should run next on the stream data. For each function, a block of code is supplied that sets the initial configuration of the matcher sub-system. The entry vector in the job control message references this block of code, which writes initial values to the Bank Enables 417, Table Base 418 and Table Size 419 registers shown in FIG. 4, as well as initiating the flow of content through a CIE 404 content shifter 420. The routine is terminated by a special instruction from the ME 412 that causes execution to cease pending the arrival of match results.

An extra level of indirection is introduced by virtue of the MIS 408 having separate mapping tables 421 for each function to allow each function to declare a completely independent set of match patterns, which may or may not overlap with the pattern set declared by another function. The CAM 407 can only output one preprogrammed value for each pattern stored in its match array. The software tool defines this value to be an index into a mapping table 421 in the MIS 408. All functions that share a given pattern must allocate the same index in their mapping table 421 for the given pattern, but the value stored at that offset in the mapping table will be function dependent, being the start address of the function's handler code for that pattern.

The system filters match results from the CAM 407 that correspond to a stored pattern that is not enabled for the current active function. This is done by comparing the index output by the CAM 407 against the size of the current mapping table 421. Match results for out of range indexes are discarded. The mapping table 421 must be at least as big as the highest shared pattern's index; hence it is likely to contain some holes. In range indexes for which there is no corresponding microcode handler are represented as zero entries in the table and are discarded. For match results that pass these tests, the mapping table 421 provides the start address of the match handler routine 427 within the instruction store 413. This address is written into the match queue 415, along with a number of information data bits that also stored in the mapping table 421 and may be specified by the programmer to provide whatever information is deemed useful for efficient identification and processing of the match.

The code base address and match information pairs exit the match queue 415 coincidentally, a new pair being supplied to the ME 412 each time it completes the handling of the previous match handler routine 427. The base address is used to trigger microcode execution from the correct point in the instruction store 413, whilst the match information is made available to a microcode execution unit 422 through a register 423. At the same time as a given match handler routine 427 begins execution, the content that caused the match is brought to the head of the content queue 416. This makes it possible for the microcode execution unit 422 within the ME 412 to examine the content and to change the state of the content gate 424 at known points relative to the match positions.

The CAM 407 is sub-divided into a number of Banks 425, whose patterns may be independently enabled or disabled. Typically, the number of Banks is 32 or less (FIG. 4 shows only four for clarity), which is insufficient to allow one bank to be allocated per function as the designer might wish. Instead, the measm tool allocates match patterns to banks conservatively, only using a new bank for a pattern if all the banks used thus far are full or if there is an interaction between the pattern and one already allocated to a bank that is shared between multiple functions. This is an important point, since if Function A declares a match for "the cat" and Function B declares a match for "the cat sat" and both are placed in the same bank, then an occurrence of the string "the cat sat" whilst Function A was enabled would erroneously fail to invoke the handler for the pattern "the cat". The solution is to put the two patterns in different banks X and Y such that Function A uses bank X and Function B uses bank Y. Both Functions are free to enable other shared banks that do not introduce such unwelcome interactions.

Further to the above, it should be noted that CAM entries are relatively expensive (both in terms of monetary cost and power consumption), compared to the static RAM used for the MIS 408, thus it is preferable to use a single CAM entry, but multiple MIS entries where many functions require the same pattern in their match set.

An important aspect of the CEG 400 is the ability to dynamically modify the match patterns used during a processing job. Thus, any match handler routine may modify the currently active match pattern set by writing a new set of values to the Bank Enables 417, Table Base 418 and Table Size 419 registers. The existence of the match queue 415 and the content queue 416, which introduce a small buffer between the CAM 407 and the point of execution, means that the change in pattern set may take effect beyond the desired point in the content. This is addressed by storing 1024 bytes of history within the ingress unit, such that microcode can request that the ingress unit start presenting content from an arbitrary point in the recent past following the change of pattern set. There is a small loss of efficiency resulting from the need to flush the queues when the pattern set is changed, however this is much less than that incurred if a new job were required in order to select the alternate pattern set.

We will now describe the role of the present invention in the context of a URL filtering service implemented by a CSG. For a user attempting to access a resource on an Internet web server, where the user's connection passes through the StreamShield CSG and the user is a registered subscriber to the URL filtering service, the sequence of events is as follows:

Step 1: An end-to-end TCP connection is established between the user and the web server, however both sides of the connection are transparently terminated within the NTP part of the CSG. This allows the CSG to inspect all data on the flow and to make selective decisions on which parts of the data should be passed or blocked.

Step 2: The request from the user's browser is transferred to the SM, thereby satisfying the default criteria for scheduling the stream to the CEG (at least 1 unprocessed byte available).

Step 3: The SM initiates a job on the first CEG in the system to become free. The job executes as described in the previous section. The default entry vector number invokes the protocol recognition function. This function instructs the CIE to match against a range of patterns that will indicate with a high degree of certainty which protocol is running on the stream (e.g. presence of GET as the first 3 characters of the stream).

Step 4: Having established that the protocol is HTTP, the protocol recognition function may terminate its processing and branch to the HTTP processing function. The latter issues a command to the ingress block to rewind to the start of the content and changes the CIE settings to select a pattern set containing HTTP related protocol elements. The CIPP is programmed to perform HTTP escape sequence removal and to squash all upper case characters to their lower case equivalents to ensure case independence in the matching of protocol elements.

Step 5: The HTTP processing state machine manipulates the content egress gate in the CIE to gate a subset of bytes from the content to the digest calculator. Each time the state machine sees the end of a sequence of bytes that represent a potentially valid URL or IP address, the ME signals to the digest calculator that it should perform the end of block processing required by the digest algorithm. The final digest value is placed into a digest array in the data store.

Step 6: The processing state machine stops when the double carriage return, line feed sequence marking the end of the first request is encountered. The microcode constructs a control message to the SM indicating the stream should be targeted at the CPC with an entry vector requesting a database lookup on the digests currently stored in data store. This digest array will subsequently written back to the stream's state buffer within the SM at the end of the job.

Figure 5:
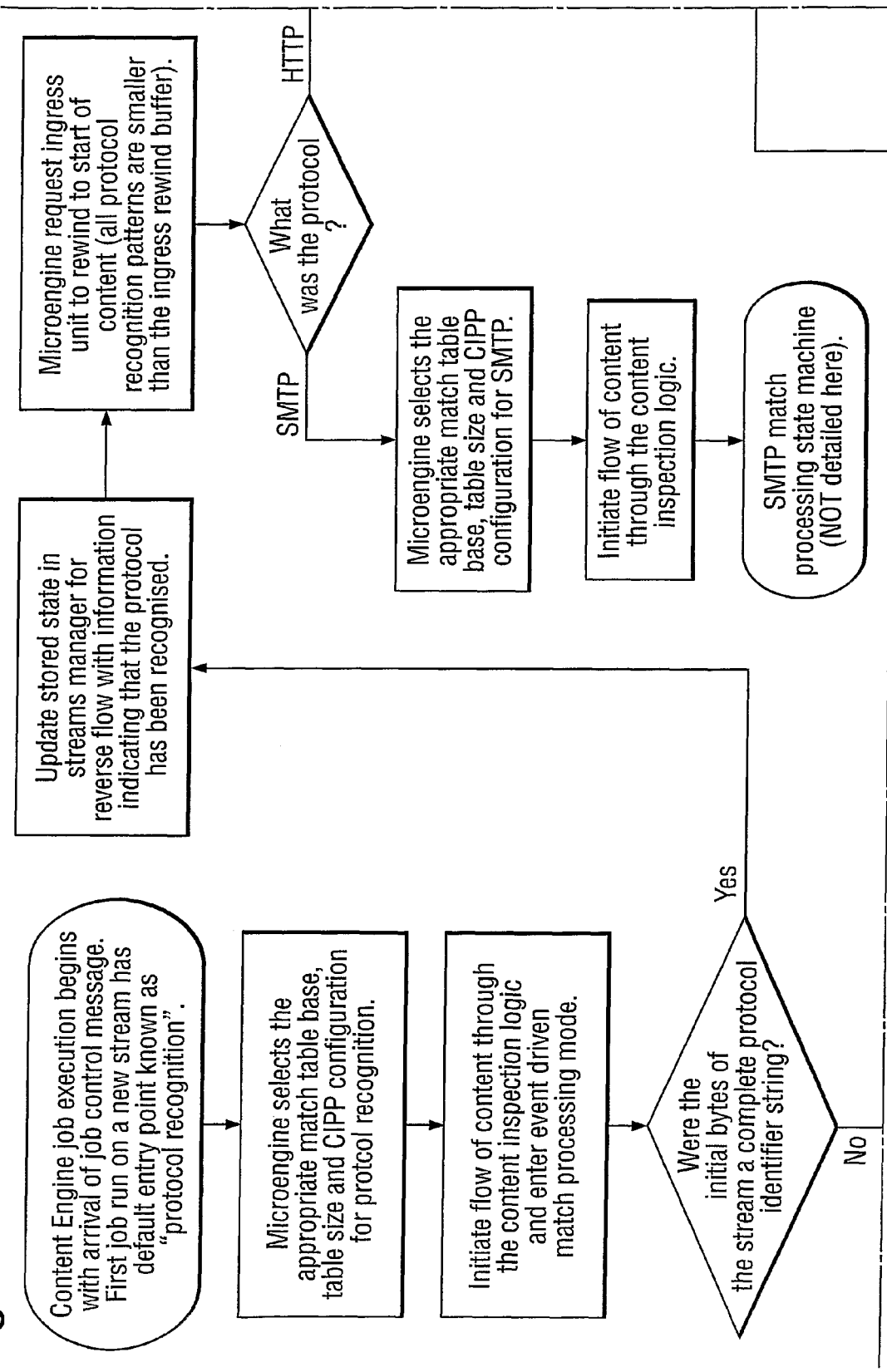

FIG. 5 is flow diagram which shows the steps (4) to (6) above in more detail. Again, the Figure covers protocol recognition and the HTTP client to server flow parser only.

Step 7: Some short time later, when the flow reaches the head of the queue of tasks waiting on the CPC, the SM supplies the CPC with the stream state information containing the digests, together with a control message identifying the stream and the work to be done, in the form of the entry vector. There is no need for the CPC to see the actual content. It performs a lookup on a large RAM based database of URL digests to obtain a category for the URL requested by the user. If the user and system preferences allow the user to see the category thus obtained, the CPC instructs the SM to release the stream data up to the end of the request (this information having been placed in the stream state by the CEG in step 6 above). Alternatively, the CPC will instruct the SM to discard up to the end of the forbidden request.

Step 8: The CPC terminates its processing of the stream by sending a control message to the SM targeting the stream back to the CEG with criteria of at least 1 byte of data beyond the end of the first HTTP request being available.

Step 9: At this point, the SM and the NTP will ensure that the request, assuming it was released, makes its way out of the SM's buffer store and to the Internet.

This above description covers the client to server flow only, but illustrates the division of tasks between the entities in the overall system.

The key benefits of the present invention are as follows:

1. High Deterministic Throughput

The hardware implementation and the microcode architecture are designed to guarantee a high deterministic processing throughput. The following design features achieve this:

Content is transferred through processing elements using a dedicated parallel data path, referred to as the content pipeline. Multiple inline processing entities may work on this data path and annotate the data flow with the results of their processing (e.g. patterns matched) or modify the data itself (e.g. Base64 decode). Small elastic buffers between the processing elements smooth the flow of data through the system, such that individual processing elements may momentarily slow down to process interesting features of the data without immediately starving the next processing entity of data.

The content stream presented to the ME is the output of the final stage of the content pipeline and therefore includes the results of all of the pre-processing steps performed by the preceding blocks. The preceding blocks are arranged in such a way that many of the exception cases that would generally complicate a traditional software processing architecture, by requiring numerous tests to be performed on each byte of content, have already been covered by the hardware. This keeps the match event driven microcode simple and in many cases, obviates the need for the ME to look at the content itself. Each match event handler is short, requiring a small number of instructions whose execution time is deterministic.

The architecture is highly parallel i.e. pre-processing, matching, match processing and writing of the modified content (where applicable) back to the SM all occur simultaneously. Each processing block manages detection of boundary conditions, such as the marker at the end of the currently available content, thus relieving the ME of this task.

Allocation of memory for state information relating to the current flow being processed is performed transparently by dedicated hardware with zero latency.

System latency is minimised by only performing work on a given network flow when an appropriate amount of data has been accumulated on that flow such that processing the available data in the CEG will produce a positive result as to the next step to be performed on that stream (e.g. release to subscriber, discard, replace with content blocked message, send to virus scanner etc.). It is the responsibility of the ME to derive appropriate criteria for further processing to be performed on the flow it has just processed, before it moves on to processing the next scheduled flow.

As mentioned above, a unit of work performed on a flow is referred to as a "job". Jobs are constrained by design so as to consume a bounded maximum number of processing cycles. This, combined with the use of multiple CEGs running in parallel, ensure that there is a bounded maximum latency between the processing condition on a given flow being met (due to the arrival of data from the network for instance) and actual processing work being performed on that flow.

2. Ease of Update

An important aspect of the present invention is the ability to quickly and transparently update the StreamScan processing function, with no downtime, in response to new network threats. This achieved by two important aspects of the design:

The hardware/software split is such that the state machines in the content pipeline, the patterns programmed into the match engine and the microcode state machines may all be upgraded without rebuilding the hardware configuration of the FPGA based StreamScan algorithm itself. Thus, the hardware provides the basic architecture, including important bounds checking and error detection, whilst the software configuration of the hardware determines the exact response to specific types of content. Such an approach is preferable to one involving dedicated content processing algorithms written in a high level hardware description language such as VHDL for example, since it avoids the lengthy verification of new hardware state machines and the risk of compromising the electrical timing within the device that are incurred when the FPGA hardware configuration is rebuilt.

The CEG does not store state relating to specific network flows beyond the end of each processing job, rather a minimum of required state information is supplied to the CEG by the SM ahead of processing a flow and any modifications to that state are written back to the central buffer store in the SM immediately following the end of processing on that flow. In this way, flows have no association with any particular engine within the system. The preferred implementation uses multiple CEGs each having a dedicated link to the SM. In such an implementation, individual CEGs may be taken offline for upgrade, whilst processing of all flows continues on the momentarily reduced set of engines.

Some updates may require changes to the format of the state information stored about each network flow. Such updates may therefore render the old and the new processing functions incompatible. The software tools used to derive the StreamScan program from source files are able to determine this, whilst the SM hardware provides features to ensure that a flow is only routed to an engine that a running the appropriate version of the StreamScan program.

3. Extensibility

The range of functions required within the CEG is not fixed, but rather will continuously evolve as new network threats come into being and new network protocols come into use.

The CEG has important design features to ensure that such additional functionality can be implemented without the need upgrade or replace the hardware. These features are as follows:

The content pipeline provides a simple flow-through streaming interface to which further processing functions can be added with minimal impact on system gate count, since the content flow is already managed by the surrounding support logic that requires no change to support additional functions.

The existing low-level pre-processing functions make extensive use of dedicated RAM blocks within the FPGA fabric. These are generally larger than the required by the current functionality, leaving space for further state machines to be added.

Use of a micro programmed engine to implement the high level protocol tracking state machine means that an increase in the number or complexity of protocols that can be handled by StreamScan translates to an increase in program size that is easily absorbed by cost effective SRAM, rather than translating into expensive extra FPGA gates.

The pattern matching system uses a CAM and SRAM external to the FPGA for pattern storage. Both can cost effectively be specified to have generous amounts of free space at design time.

The present invention need not be deployed in a network device, but could be included on PCI card (or similar) to be installed in a computer. The data is then fed to the invention over a computer bus, and is delivered as native pieces of content (files, e-mails, web pages) or streams of data as in the normal mode of the invention.

The present invention is primarily aimed at processing content as it flows through a network, but is equally valuable in processing content which is say stored in a static location, such as a file or mail server.

The invention claimed is:

1. A data processing device for processing streams of content data, comprising:
    a streams manager for generating control messages defining one or more of a plurality of predetermined subscriber-specific content processing functions to be performed upon a received content data stream;
    content inspection logic configurable to perform pattern matching functions to detect, in a received content data stream, one or more predefined patterns each having a unique pattern index number, and to output match data comprising, for each matched pattern, a match index number comprising the respective pattern index number of the matched pattern;
    a programmable microprocessor unit for executing computer program instructions, coupled to an instruction store for storing a plurality of match handler routines each of which are executable by the programmable microprocessor unit to perform content processing of a received content data stream;
    a match information store for storing, for each of said plurality of predetermined subscriber-specific content processing functions, a set of cross-references between one or more of said pattern index numbers and one or more of said match handler routines to be executed upon detection of the respective pattern in a received content data stream,
    the programmable microprocessor unit being coupled to the content inspection logic to receive match data in respect of a received content data stream and to the streams manager to receive notification of a defined subscriber-specific content processing function to be performed on the received content data stream and, with reference to a respective set of cross-references stored in the match information store, to identify a match handler routine based on the pattern index number defined in the received match data and to execute said identified match handler routine to implement content processing thereby to perform the notified subscriber-specific content processing function in response to the received content data stream; and
    a content queue store, in which content of the received content data stream is queued in the content queue store during processing of the content and wherein the flow of content to an output is controlled in dependence on the outcome of the subscriber-specific content processing function and the flow of received content data is controlled in dependence on the outcome of the subscriber-specific content processing function.

2. The device according to claim 1, in which the programmable microprocessor unit is a microengine.

3. The device according to claim 1, arranged to generate a match handler request for each cross-referenced match handler routine that is identified for execution by the programmable microprocessor unit.

4. The device according to claim 3, further comprising a match queue store coupled between the content inspection logic and the programmable microprocessor unit which stores match handler requests to be executed by the programmable microprocessor unit.

5. The device according to claim 1, further comprising an egress unit, the content queue store being coupled between the content inspection logic and the egress unit, wherein the content queue store includes a content gate which is controlled by the programmable microprocessor unit to gate the flow of received content data into the egress unit.

6. The device according to claim 5, wherein the egress unit further comprises a memory for storing received content data.

7. The device according to claim 5, further comprising a data converter coupled to the content queue store and to the programmable microprocessor unit, which is operative to generate data on values within predetermined fields within the received content data stream for consumption when processing content by the programmable microprocessor unit.

8. The device according to claim 1, further comprising a digest calculator which is operative to provide content digest data for consumption by the programmable microprocessor unit.

9. The device according to claim 1, further comprising an input demultiplexer which is operative to extract control messages, sent by the streams manager, from within the received content data stream.

10. The device according to claim 9, in which the control messages include state information associated with a received content data stream.

11. The device according to claim 10, further comprising a data store coupled between the input demultiplexer and the programmable microprocessor unit, the data store storing state information contained within control messages extracted by the input demultiplexer from a received content data stream.

12. The device according to claim 1, further comprising an ingress unit having a memory which is operative to store received content data.

13. The device according to claim 12, further comprising a management state machine coupled to the ingress unit and to the programmable microprocessor unit, wherein the ingress unit is responsive to control messages from the streams manager, extracted by a demultiplexer, to pass state information to the management state machine which determines the type of subscriber-specific content processing function to be performed for a received content data stream.

14. The device according to claim 13, in which the control message includes an entry vector which identifies the type of subscriber-specific content processing function to be performed.

15. The device according to claim 12, further comprising a content inspection preprocessor coupled to the ingress unit, the content inspection preprocessor being operative to perform one or more data transformations on the received content data stream before it is passed from the ingress unit to the content inspection logic for pattern matching.

16. The device according to claim 1, arranged to implement a plurality of different types of content processing in order to perform the plurality of predetermined subscriber-specific content processing functions, said processing including: protocol recognition, protocol decode, pattern matching, tokenisation, digest calculation, content decomposition and decompression.

17. The device according to claim 1, in which the content inspection logic includes a storage memory, which stores a set of data patterns, wherein each of said plurality of predetermined subscriber-specific content processing functions defines at least a first subset of data patterns to be used by the content inspection logic to perform respective pattern matching functions.

18. The device according to claim 1, wherein the device is adapted to process streams of network borne data.

19. A computer-implemented method of processing streams of content data, the method comprising the steps of:
receiving a content data stream;
identifying a subscriber associated with the received content data stream;
determining and defining, in a control message to be included with the received content data stream, one or more of a plurality of predetermined types of subscriber-specific content processing functions to be performed on the received content data stream;
configuring a content inspection logic to perform a first pattern matching function in respect of the determined type of subscriber-specific content processing function and to output match data referencing a matched pattern, from amongst a plurality of predetermined patterns, in the received content data stream;
with reference to a match information store, processing match data output by the content inspection logic to identify at least one match handling routine to be performed on the received content data stream in respect of a matched pattern identified in the match data and of the one or more determined subscriber-specific content processing functions; and,
configuring a programmable microprocessor unit to execute the identified at least one match handler routine to implement content processing thereby to perform the one or more determined subscriber-specific content processing functions on the received content data stream, in which content is queued in a content queue whilst the content is being processed and the flow of content to an output is controlled in dependence on the outcome of the determined subscriber-specific content processing function and in which the flow of received content data is controlled in dependence on the outcome of the determined subscriber-specific content processing function.

20. The method according to claim 19, in which the control message includes state information associated with a received content data stream.

21. The method according to claim 20, in which the control message includes an entry vector which determines the type of subscriber-specific content processing function to be performed.

22. The method according to claim 19, in which the match data includes an identifier that determines a stored match handler routine to be executed to perform content processing on the received content data stream.

23. The method according to claim 22, in which the match data are converted into a match handler request which identifies a match handler routine stored in an instruction store.

24. The method according to claim 23, in which the match handler requests are queued.

25. The method according to claim 24, in which whilst one match handler routine is executed, the match handler routine for a subsequent match handler request is prefetched so that it is ready to be executed once the previous match handler routine has been completed.

26. The method according to claim 19, in which the received content data stream is preprocessed by performing one or more data transformations before the transformed content is passed for pattern matching.

27. The method according to claim 19, in which the content processing for performing the plurality of predetermined subscriber-specific content processing functions includes: protocol recognition, protocol decode, pattern matching, tokenisation, digest calculation, content decomposition and decompression.

28. The method according to claim 19, further comprising the step of updating pattern matching functions stored in the content inspection logic.

29. A computer-implemented method of processing streams of content data, the method comprising the steps of:
receiving a content data stream;
extracting a control message from the received content data stream, the control message including an identifier which determines a type of content processing function to be performed on the received content data stream;
configuring a content inspection logic to perform a first pattern matching function in respect of the determined type of content processing function and to output match data referencing a matched pattern, from amongst a plurality of predetermined patterns, in the received content data stream;
with reference to a match information store, processing match data output by the content inspection logic to identify at least one match handling routine to be performed on the received content data stream in respect of a matched pattern identified in the match data and of the determined content processing function; and,
configuring a programmable microprocessor unit to execute the identified at least one match handler routine thereby to implement the determined content processing function on the received content data stream, in which content is queued in a content queue whilst it is being processed and the flow of content to an output is controlled in dependence on the outcome of the determined content processing function and in which the flow of received content data is controlled in dependence on the outcome of the content processing function.

30. The method according to claim 19, in which received content data is modified before it is released from the content queue.

31. The method according to claim 19, further comprising the step of adding state information to the received content data stream.

32. The method according to claim 31, in which the state information includes a control message which identifies what further content processing is to be carried out on that stream.

33. The method according to claim 19, in which the received content data stream comprises network borne data.

34. The method according to claim 29, wherein the same content can be reprocessed using a different pattern matching function.

35. A data processing device for processing streams of content data, comprising:
a demultiplexer configured to extract a control message from a received content data stream, the control message including an identifier which determines a type of content processing function to be performed on the received content data stream;
a content inspection engine configured to:
  perform a first pattern matching function in respect of the determined type of content processing function; and
  output match data referencing a matched pattern, from amongst a plurality of predetermined patterns, for the received content data stream;
a match information store configured to process match data output by the content inspection logic to identify at least one match handling routine to be performed on the received content data stream in respect of a matched pattern identified in the match data and of the determined content processing function;
a microprocessor unit configured to execute the identified at least one match handler routine thereby to implement the determined content processing function on the received content data stream; and
a content queue in which content is queued while the content is being processed and wherein the microprocessor unit controls the flow of content to an output in dependence on the outcome of the determined content processing function and in which the flow of received content data is controlled in dependence on the outcome of the content processing function.

* * * * *